(12) United States Patent
Lelu

(10) Patent No.: US 6,252,366 B1
(45) Date of Patent: Jun. 26, 2001

(54) DEVICE FOR DIGITALLY SLAVING THE POSITION OF A MOVING PART

(75) Inventor: Pierre Lelu, Saint Cyr l'Ecole (FR)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/462,237

(22) PCT Filed: Jul. 3, 1998

(86) PCT No.: PCT/EP98/04952

§ 371 Date: Mar. 27, 2000

§ 102(e) Date: Mar. 27, 2000

(87) PCT Pub. No.: WO99/01804

PCT Pub. Date: Jan. 14, 1999

(30) Foreign Application Priority Data

Jul. 4, 1997 (FR) .................................................. 97 08515

(51) Int. Cl.⁷ ...................................................... G05B 11/01
(52) U.S. Cl. .......................... 318/560; 318/254; 318/439; 318/562; 318/568.16; 318/569; 318/572; 318/600; 318/636
(58) Field of Search ..................................... 318/254, 439, 318/560, 562, 568.16, 569, 572, 600, 636

(56) References Cited

U.S. PATENT DOCUMENTS

| | | | |
|---|---|---|---|
| 4,263,537 | 4/1981 | Bettin et al. ........................ | 318/561 |
| 4,697,125 | * 9/1987 | Coff et al. ............................. | 318/254 |
| 5,371,449 | * 12/1994 | Tajima et al ......................... | 318/560 |
| 5,768,229 | * 6/1998 | Ikeda .................................. | 369/44.28 |
| 5,789,893 | * 8/1998 | Watkins ................................ | 318/701 |
| 5,825,318 | * 10/1998 | Patapoutian et al. ................. | 341/131 |

FOREIGN PATENT DOCUMENTS 59-102557  6/1984  (JP) .............................. B23Q/15/22

OTHER PUBLICATIONS

"Shift Positioner", R.H. Thomas, et al "IBM Technical Disclosure Bulletin, vol. 9 No. 8, Jan. 1967".
Preliminary Search Report, dated Jul. 4, 1997.

* cited by examiner

*Primary Examiner*—Robert E. Nappi
*Assistant Examiner*—Rita Leykin

(57) ABSTRACT

Device for digitally slaving the position of a moving part, including: a digital sensor (20) which is intended to measure the actual position of the moving part (10) and delivers a digital effective position value, drive means comprising an electric motor (30) for driving the moving part into a setpoint position defined by a digital setpoint value, a digital control unit (50) delivering at least one signal for controlling a circuit (40) for supplying the motor as a function of the discrepancy between the said setpoint value and the said actual value, in which the digital sensor having a determined measuring interval, the motor supply circuit comprises timer means for maintaining the supply to the motor for the time which is necessary and sufficient for the sensor to be positioned at the middle of the interval corresponding to the setpoint value.

4 Claims, 3 Drawing Sheets

FIG_1
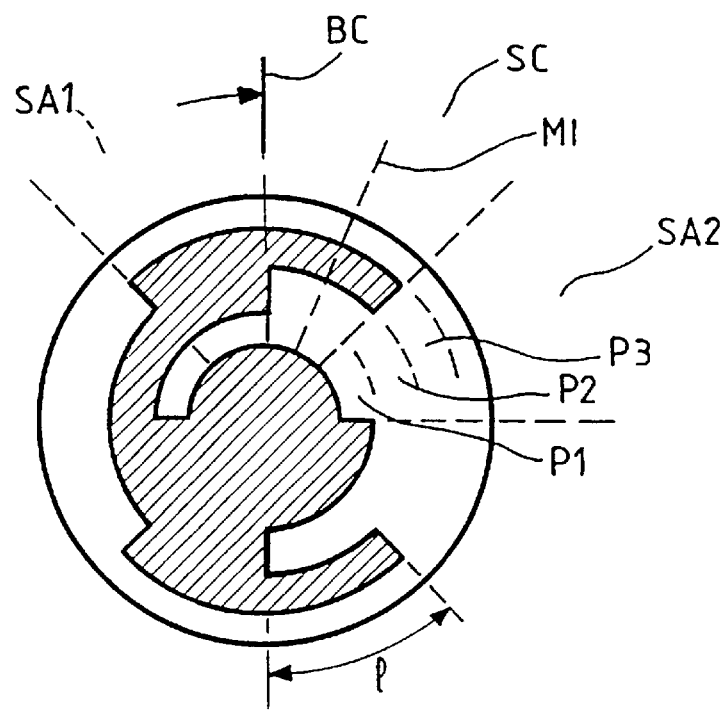
FIG_2
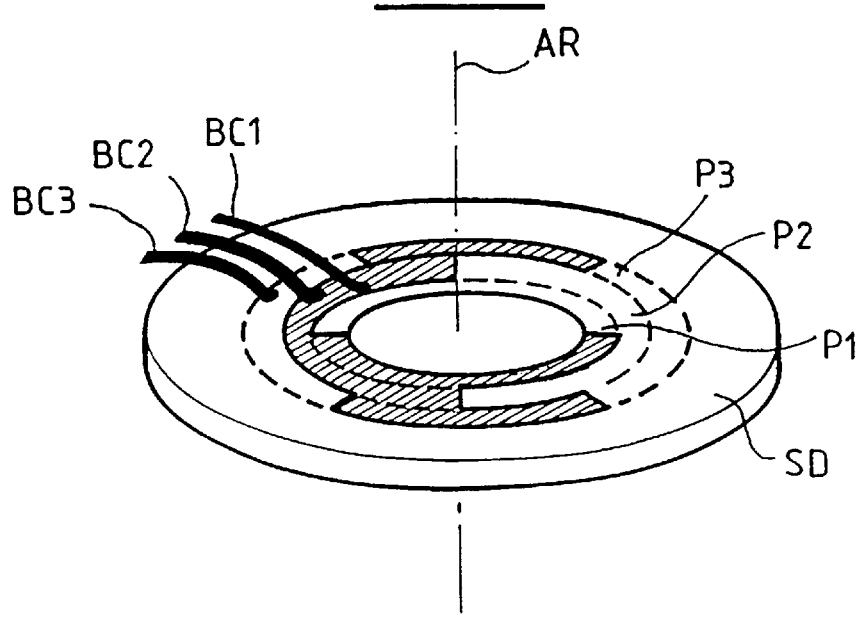

FIG_3
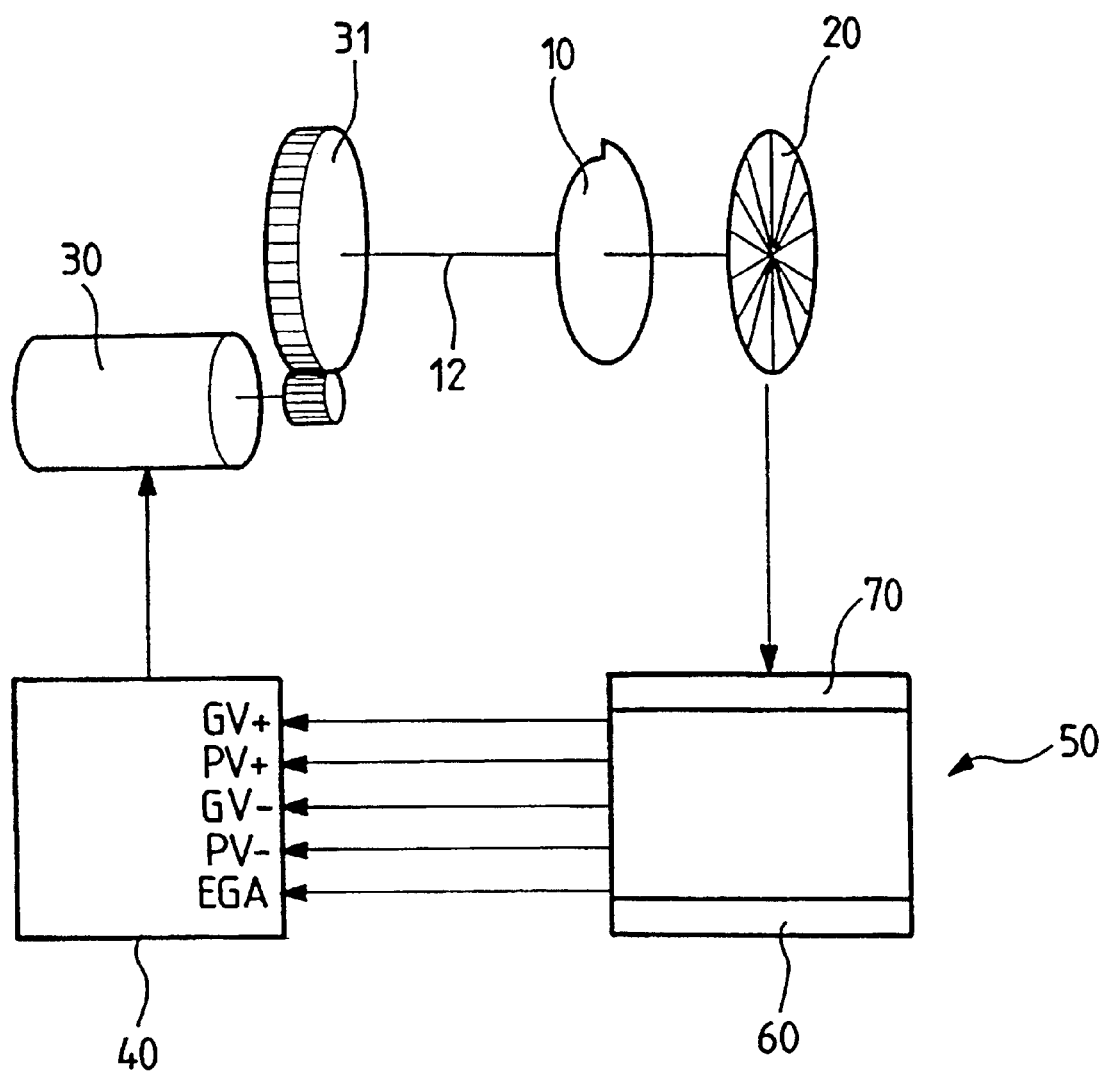

DEVICE FOR DIGITALLY SLAVING THE POSITION OF A MOVING PART

CROSS REFERENCE TO RELATED APPLICATION

This application claims priority of PCT Application No. 9708575, which was filed on Jul. 4, 1997.

BACKGROUND OF THE INVENTION

1. Field of the Invention

The present invention relates to a device for digitally slaving the position of a moving part.

2. Description of the Related Art

Digitally slaving the position of a moving part is useful in the field of directional radio equipment, the said moving part being, for example, a plunger whose position of varying insertion through a longitudinal slot made in a rectangular waveguide determines the variation in a characteristic quantity of the electric field propagating inside the guide. On account of the essentially resistive nature of the plunger, this produces an attenuator for a rectangular waveguide.

A digital slaving device generally includes:
- a digital sensor which is intended to measure the actual position of the moving part and delivers a digital effective position value,
- drive means comprising an electric motor for driving the moving part into a setpoint position defined by a digital setpoint value,
- and a digital control unit delivering at least one signal for controlling a circuit for supplying the motor as a function of the discrepancy between the said setpoint value and the said actual value.

The digital sensor comprises, for example, an encoder of the Gray type formed by a set of discontinuous conductive tracks, as well as a transcoder for converting the value supplied by this encoder into a digital value in binary code.

The digital sensor has a measuring interval between two successive values which is equal to 1, as can be seen for example in FIG. 1, which shows a digital encoder of the Gray type including three concentric discontinuous annular conductive tracks P1, P2, P3. These tracks are engraved on a dielectric substrate SD and are all connected to a DC supply voltage. Furthermore, as can be seen in FIG. 2 which is a three-dimensional view of an encoder of this type, they also have three elastically mounted contact terminals, BC1, BC2 and BC3 respectively, rubbing against them. The signals which these contact terminals deliver determine the value, in Gray code, corresponding to the angular position of the encoder when it is rotated about its axis AR.

The encoder which is described is an encoder having eight separate angular positions distributed regularly over 360°. The measuring interval can then be expressed as the angle of the annular sector within which the terminals BC1, BC2 and BC3 remain individually subjected to a constant potential and therefore indicate a constant angular position. This interval is 1=45° with the three-track (and therefore eight-position) encoder in FIG. 1.

Furthermore, this figure schematically uses a bold line, referenced BC and lying on a radius of the circles constituting the generatrices of the annular tracks P1 to P3, to represent the relative angular position of the contact terminals BC1 to BC3 on the tracks.

The drive means may also comprise a reducing gear arranged between the output shaft of the motor and the moving part. The encoder is linked in rotation with the output shaft of the motor or some element of the reducing gear.

If the speed of rotation of the motor is slow enough in relation to the resistive torque applied to it, the movement of the driven part is stopped as soon as the difference between the digital values for setpoint position and actual position becomes zero, and the supply to the motor is consequently cut.

The radius BC then substantially coincides with the boundary between the setpoint sector sc and the preceding adjacent sector, this being defined with reference to the direction of movement of the tracks relative to the contact terminals. However, the direction of rotation of the motor depends on the setpoint position relative to the position previously occupied by the moving element, that is to say, furthermore, the sign of the difference between the setpoint value and the actual value. Indeed, the slaving is intended to make this difference zero (this is also referred to as convergence between the actual position and the setpoint position). Therefore, depending on the direction of rotation of the motor, the said sector will be one or other of the two sectors SA1 or SA2 adjacent to the setpoint sector SC.

Between these two situations, which correspond to a unique balance position for the digital slaving, there is an error on the actual position of the driven moving element, and this error is proportional to the measuring step 1 of the digital sensor. This error does, of course, decrease as the measuring interval 1 becomes smaller, that is to say when the encoder has a large number of separate positions. In addition, it can be further reduced by at best a factor of N, where N is the reducing gear ratio, if the encoder is appropriately connected with this reducing gear. Nevertheless, there are applications in which the effects of this error, even when reduced as far as possible, are still unacceptable. This is the case for the application envisaged above, in which the height to which the plunger is inserted into the guide is critical. Therefore, there is a need for a simple and effective way of eliminating the effects of the measuring interval of the digital position sensor.

SUMMARY OF THE INVENTION

The invention provides a slaving device of the aforementioned type, in which the digital sensor having a determined measuring interval, the motor supply means comprise timer means for maintaining the supply to the motor for a time which is necessary and sufficient for the sensor to be positioned at the middle of the interval corresponding to the setpoint value.

In this way, the radius BC coincides with the middle MI of the setpoint sector SC when the supply to the motor is cut, irrespective of the direction of rotation of the motor. The result of this is that the actual position of the moving element, for the corresponding setpoint position, is independent of the previous position occupied by the moving element.

However, if the speed of rotation of the motor is high relative to the resistive torque to which it is subjected, the motor may continue to drive the moving element through inertia even after its supply means have been cut off, so that the radius BC will lie significantly beyond the boundary between the setpoint value SC and the previous adjacent sector SA1, or even the boundary between the setpoint sector SC and the following adjacent sector SA2.

This will result in an actual position for the moving element which is poorly controlled or even wrong.

In order to overcome this drawback, the invention furthermore provides a motor supply circuit which comprises first means for operating the motor at a first speed, referred to as high speed, and second means for operating the motor at a second speed, referred to as slow speed and less than the said high speed, the motor being supplied by the said first means when the discrepancy between the setpoint value and the actual value is greater than a determined threshold, and by the said second means in the converse case.

Since the notion of speed is a relative one, it would seem necessary to define what is meant by high speed and slow speed according to the invention:

a high speed is a speed of rotation of the motor which is large enough for it to be possible, after the motor supply has been cut, for the motor to drive the moving element through its inertia beyond the position which it occupied when the supply was cut, which may result in a positional error for this element;

conversely, a slow speed is such that, when the motor supply is cut, the motor stops moving without a significant delay, so that the moving element remains in the position which it occupied at the moment when the supply was cut.

However, it is quite clear that these definitions remain relative and depend on the dynamic characteristics of the slaved system, in particular the torque which the motor develops and the resistive torque exerted by the moving element and, when appropriate, by the reducing gear. When it is desired to obtain the shortest possible convergence time for the slaving, while avoiding positioning errors, as is the case in the application in question, it is advantageous to supply the motor at two different speeds, as indicated above. Furthermore, this arrangement combines well with the effect of the aforementioned timer means in order to produce precise and reproducible positioning irrespective of the direction of rotation of the motor, insofar as the timer means work properly only if the speed of rotation of the motor is slow.

BRIEF DESCRIPTION OF THE DRAWINGS

Other characteristics and advantages of the invention will further become apparent on reading the following description. The said description is purely illustrative and should be read with reference to the appended drawings, in which:

FIG. 1 and FIG. 2, already dealt with, represent a digital encoder of the Gray type;

FIG. 3 represents a diagram of a slaving device to which the present invention relates;

DETAILED DESCRIPTION OF THE INVENTION

Figure 4:
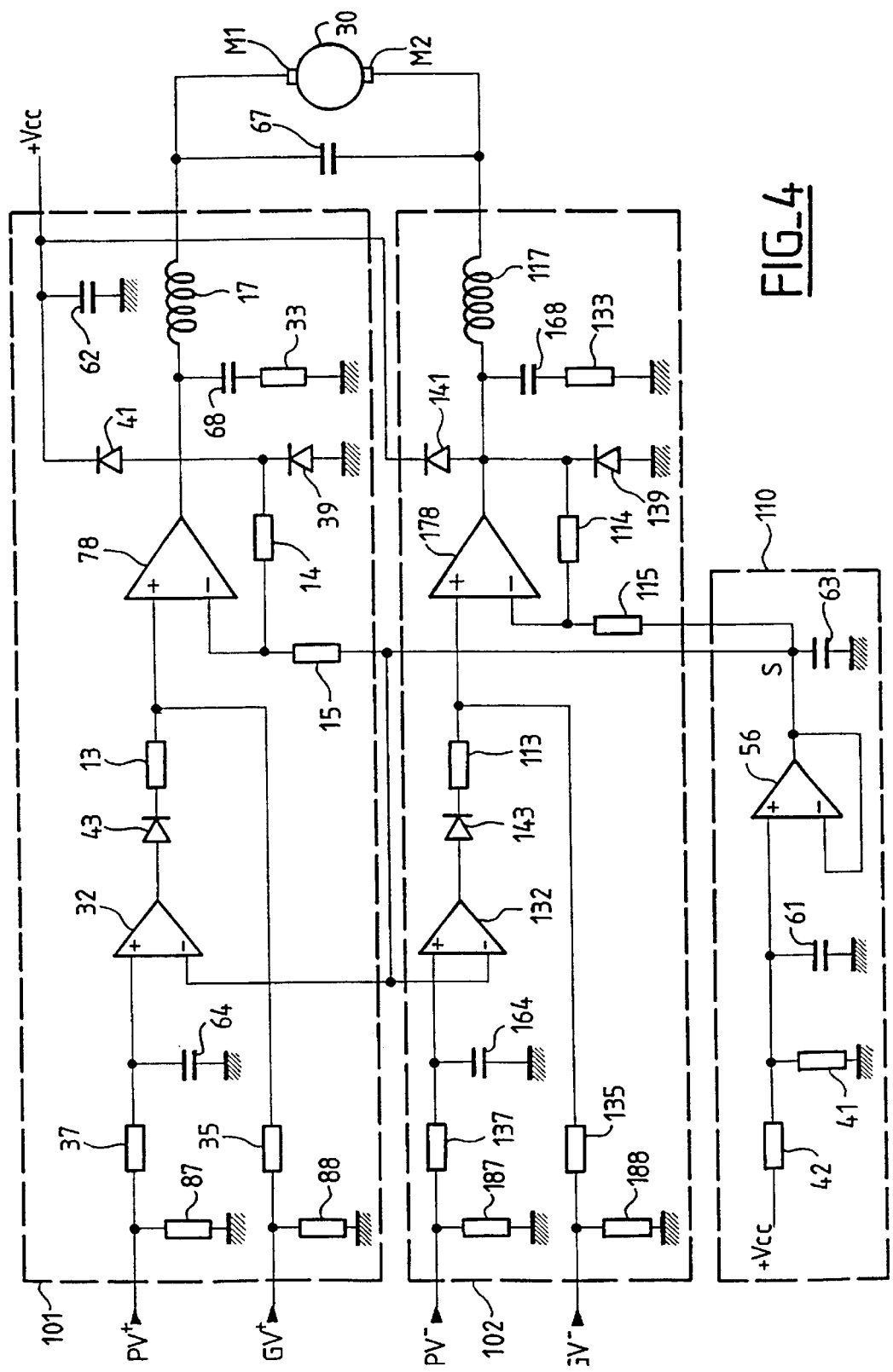
FIG. 4 represents a preferred embodiment of the motor supply circuit according to the invention.

FIG. 3 represents a device according to the invention. The moving part is a plunger 10 which is rotated about an axis 12 by a motor 30 via reducing gear 31.

An angular position encoder 20 is linked in rotation with the plunger 10 so as to be driven without sliding relative to it. The information supplied by the encoder 20 is transmitted to a digital management unit 50. The position encoder 20 is, for example, an encoder of the Gray type, in which case the digital value which it transmits to the management unit 50 needs to be converted into binary code before any calculation takes place. The digital value of the actual position of the plunger 10 which the encoder 20 supplies in Gray code is therefore converted into binary code and is recorded in an actual-position register 70 of the management unit 50, for example a shift register.

The management unit 50 also receives a digital setpoint position value in binary code, which is stored in a setpoint register 60, for example a shift register. The setpoint position value is modified each time the gain of the attenuator needs to be modified. The management unit 50 digitally takes the difference bit by bit between the setpoint value delivered by the register 60, on the one hand, and the value of the actual position of the plunger 10 which is delivered by the register 70, on the other hand.

If there is a positive difference between the above binary values which exceeds a threshold value (for example equal to 3 in binary), the management unit 50 delivers a high logic state (i.e. a logic 1) on a first input GV+ of a circuit 40 for supplying the motor 30, and a low logic state (i.e. a logic zero) on a second input PV+ as well as on a third input GV− and on a fourth input PV− of the said circuit.

If there is a negative difference which is greater than the said threshold value, the management module 50 delivers a logic 1 on the third input GV−, and a logic zero on the other inputs of the circuit 40. If there is a positive difference which is less than the threshold value, the management module 50 delivers a logic 1 on the second input PV+ of the circuit 40, and a logic zero on the other inputs of the said circuit. If there is a negative difference which is less than the threshold value, the management unit delivers a logic 1 on the fourth input PV− of the circuit 40, and a logic zero on the other inputs of the said circuit.

If the two binary values are equal, then the management unit 50 transmits a logic 1 on the fifth input EGA of the supply circuit 40 and a logic zero on the other inputs of the said circuit.

The motor supply circuit 40 is designed to produce a waveform for supplying the motor 30. This supply waveform is intended to rotate it in a first direction (referred to as positive by convention) at a high speed in the first of the above cases. It is intended to rotate it in the other positive direction but at a slow speed in the second of the above cases. It is intended to rotate it in the other direction (referred to as the negative direction by convention) at a high speed in the third of the above cases. Finally it is intended to rotate it in the negative direction at a slow speed in the fourth of the above cases.

The motor 30 is, for example, a DC motor and the supply waveform produced by the power module 40 is a bipolar continuous voltage. This continuous voltage is then a positive voltage in the first and second cases, and negative in the second and third of the above cases. In absolute terms, it has a first value in the first and third cases, and a second value, less than the said first value, in the second and fourth of the above cases. It is, for example, zero in the fifth case, so that the motor does not rotate.

Thus, so long as the binary difference between the setpoint value and the actual position value is greater than the threshold, only one of the inputs GV+ or GV− is in the high logic state. The motor is supplied so as to rotate respectively in the positive or negative direction at a high speed, so as to reduce this difference. When it becomes less than the threshold, only one of the inputs PV+ or PV− of the circuit 40 is in the high logic state. The motor is then supplied so as to rotate respectively in the positive or negative direction at a slow speed. When this difference becomes zero, the four inputs GV+, GV−, PV+ and PV− are in the low logic state, and the supply to the motor will be referred to as being cut. The input EGA of the supply circuit 40 then changes to the high logic state for the purposes of status control which are not directly connected with the invention and will not be described below.

As will have been understood, the management unit 50 is, for example, a microcontroller.

FIG. 4 represents one possible embodiment of a motor supply circuit according to the invention. This circuit comprises two parallel paths 101 and 102, connected respectively to a first terminal M1 and a second terminal M2 of the motor 30. These paths are identical to each other and only the first part 101 will be described in detail below. The supply circuit furthermore includes a biasing circuit 110 whose purpose will become apparent in the description which follows.

The path 101 includes a first resistor 37, a first terminal which is connected to the input PV+ of the circuit and also to earth via a resistor 87. The second terminal of the resistor 37 is connected to a non-inverting input of an operational amplifier 32, as well as to earth via a capacitor 64. The output of the operational amplifier 32 is connected to the anode of a diode 43 whose cathode is connected to the first terminal of a resistor 13. The second terminal of the resistor 13 is connected to the non-inverting input of a power operational amplifier 78. An amplifier of this type is capable of delivering a high output current (it is also referred to as a "driver" in the terms of the art). The path 101 furthermore includes a resistor 35, a first terminal of which is connected to the input GV+ of the circuit and also to earth via a resistor 88. The second terminal of the resistor 35 is connected to the common point between the resistor 13 and the non-inverting input of the power operational amplifier 78. The output of the latter is connected to the anode of a diode 41, the cathode of which is connected to a positive supply voltage +Vcc. It is also connected to the cathode of another diode 39, the anode of which is earthed. The output of the amplifier 78 is further connected to its inverting input via a resistor 14 so as to produce feedback. Finally, the output of the amplifier 78 is connected to the terminal M1 of the motor via an inductor 17. It is also earthed via a capacitor 68 and a resistor 33 in series. The resistor 33 and the capacitor 68 produce the dynamic load of the amplifier 78. With the capacitor 67, the inductor 17 forms a filter intended to prevent the propagation of the switching transients of the motor. The diodes 41 and 39 are intended to short-circuit the motor when the inputs of the amplifier 78 are at zero. They thus produce braked stopping of the motor.

As has been mentioned, the second path 102 of the supply circuit in FIG. 4 is identical to the first path 101, and the corresponding elements in this path have the same reference numbers as those in the path 101, but with one hundred added to them. The path 102 is connected to the two inputs PV− and GV− corresponding to the inputs PV+ and GV+ respectively on the path 101. The output of the inductor 117 is connected to the second terminal M2 of the motor.

A capacitor 67 is connected between the terminals M1 and M2 of the motor. Furthermore, a smoothing capacitor 62 is connected between the positive supply +Vcc and earth.

The supply circuit also includes a biasing circuit 110 intended, at the point S, to supply a continuous voltage for biasing the operational amplifiers 32 and 132, as well as the inverting inputs of the power operational amplifiers 78 and 178. This biasing circuit 110 includes a first resistor 42, one terminal of which is connected to the positive supply voltage +Vcc, and the other terminal of which is connected to the non-inverting input of an operational amplifier 56, as well as to earth via a second resistor 41. A capacitor 61 also earths the inverting input of the amplifier 56. Another capacitor 63 is connected between the output S of the amplifier 56 and earth. The resistors 41 and 42 operate as a voltage divider bridge. The output S of the amplifier 56 is also connected to its inverting input. Connected up in this way, the operational amplifier 56 operates as a voltage follower. The output S of the amplifier 56 constitutes the output of the biasing circuit 110. It is directly connected to the inverting inputs of the operational amplifiers 32 and 132. It is also connected to the inverting input of the power operational amplifier 78 via a resistor 15, as well as to the inverting input of the power operational amplifier 178 via a resistor 115.

The voltage at the point S is determined by the gain of the divider bridge formed by the resistors 41 and 42 and is, for example, equal to 2.5 volts.

The supply circuit operates as follows. The operational amplifier 32, the non-inverting input of which is loaded by the RC cell formed by the resistor 37 and the capacitors 64, operates as a monostable circuit and constitutes the timing means according to the invention. The power operational amplifier 78 operates as an amplifier so as to produce a supply voltage for the motor 30 as a function of the voltages applied to its non-inverting input and the voltage at the point S.

The operation of the supply circuit will be described by distinguishing between four different cases:

In the first case (rotation in the positive direction at a high speed) only the input GV+ receives a positive voltage (logic level 1) for example equal to 5 volts, the other inputs PV+, PV− and GV− receiving a zero voltage (logic level 0). The voltage of the terminal GV+ is recovered directly on the non-inverting input of the power operational amplifier 78. Since this voltage is very much greater than the output voltage S of the biasing circuit 110 which is transmitted onto the inverting input of the amplifier 78 via the resistor 15, the output of this amplifier is a positive value very close to the voltage +Vcc. It will be noted that the monostable formed by the operational amplifier 32, the resistor 37 and the capacitor 64 is not involved since the diode 43 is reverse-biased. The supply voltage +Vcc which is present at the output of the amplifier 78 and which is, for example, equal to 8 volts is then recovered on the first terminal M1 of the motor. Since the voltage present on the input GV− of the second path 102 is zero, the non-inverting input of the power operational amplifier 178 is also zero, and therefore less than the one imposed on the inverting input by the biasing circuit 110 via the resistor 115, so that the output of the amplifier 178 is close to the zero voltage. Substantially zero voltage is then recovered on the second terminal M2 of the motor. The motor then rotates at a high speed in the positive direction. It will be noted that the monostable circuit formed by the operational amplifier 132 and the resistor 137 as well as the capacitor 164 is also not involved.

In the second case (rotation in the positive rotation direction at slow speed) only the input terminal PV+ of the path 101 receives a positive voltage equal to 5 volts (logic level 1), all the other terminals GV+, PV− and GV− receiving a zero voltage (logic level zero). The capacitor 64 is then charged through the resistor 37 with a time constant RC equal to the product of their values, and when the voltage at its terminals becomes greater than the voltage imposed by the biasing circuit 110 on its inverting input, that is to say 2.5 volts, the output of the amplifier 32 changes to a positive voltage. The diode 43 then becomes forward-biased. Since the input GV+ is substantially earthed, the resistors 13 and 35 behave as a voltage divider bridge, so that the continuous positive voltage present on the non-inverting input of the power operational amplifier 78 is less than in the first case above. For its part, the operation of the path 102 is identical to the operation in the first case above, so that the voltage applied to the second supply terminal M2 of the motor is a substantially zero voltage. Conversely, the output voltage of the power operational amplifier 78, which is applied to the first terminal M1 of the motor, is less than would be applied in the first case above and is for example equal to 4 volts. The motor therefore rotates in the positive direction at a slow speed, which is less than the speed in the first case above.

In a third case (rotation in the negative direction at high speed), the operation of the first path 101 and that of the second path 102 are reversed relative to the first case above. The result of this is that the first terminal M1 of the motor has a substantially zero voltage applied to it, and the second terminal M2 of the motor has the positive supply voltage +Vcc applied to it. The voltage across the terminals of the motor is therefore the inverse of the one imposed in the first case above. The motor therefore rotates in the negative direction at a high speed.

In a fourth case (rotation in the negative direction at slow speed) only the input PV− of the second path 102 receives a positive voltage (logic level 1), the other inputs PV+, GV+ and GV− receiving a zero voltage (logic level 0). The operation of the circuit in this fourth case is symmetrical with the operation in the second case above, so that the first terminal M1 of the motor has a substantially zero voltage applied to it, whereas the second terminal M2 of the motor has a positive voltage (4 volts in the example) applied to it which is less than was imposed on it in the second operation case above (8 volts in the example). The motor then rotates at a slow speed in the negative direction.

As will have been understood, when the supply to the motor is cut, that is to say, depending on the case, when the voltage on the input PV+ or on the input PV− is reduced to zero, the capacitor 64 discharges through the resistor 37, or the capacitor 164 discharges through the resistor 137, respectively, with a time constant RC equal to the product of the value of this resistor and the value of this capacitor which form an RC cell, so that the output of the operational amplifier 32, or 132 respectively, remains at the high state during the time period. Although cut at the control inputs GV+, PV+, GV− and PV−, the supply to the motor is therefore maintained by virtue of the timer means formed by the monostable circuits. The calculation of the value of the components of the RC cell is dictated by the period required for this timing. This period is the period which is necessary and sufficient for the digital sensor used to measure the actual position of the moving element to be positioned at the middle of the measuring interval corresponding to the setpoint position. This period can be determined experimentally when calibrating the device.

It will be noted that, in the case where operation is required at a slow speed and at a high speed, the timing means according to the invention are contained in the means for driving the motor at a slow speed.

The invention has been described in a preferred but non-limiting embodiment, and can be realized in any other equivalent way within the scope of the person skilled in the art.

What is claimed is:

1. A device for digitally slaving the position of a moving part, comprising:

a digital sensor that measures an actual position of a moving part and delivers a digital effective position value, an electric motor that drives the moving part into a setpoint position defined by a setpoint value, a digital control unit that delivers at least one signal for controlling a motor supply circuit, the motor supply circuit supplying the motor as a function of the discrepancy between the setpoint value and the actual value, the digital sensor having a determined measuring interval, the motor supply circuit having a timer that maintains the supply to the motor for a time which is necessary and sufficient for the sensor to be positioned at a middle position of an interval corresponding to the setpoint value.

2. The device of claim 1, wherein the motor supply circuit comprises first means for operating the motor at a first speed, and second means for operating the motor at a second speed, the second speed being less than the first speed, the motor being supplied by the said first means when the discrepancy between the setpoint value and the actual value is greater than a threshold, and by the said second means in the converse case.

3. The device of claim 2, wherein the timer means comprises a monostable circuit.

4. The device of claim 2, wherein the timer means is contained in the second means for operating the motor.

* * * * *